(No Model.)

R. SPROUL.
SHAFT ATTACHMENT FOR VEHICLES.

No. 394,142. Patented Dec. 4, 1888.

WITNESSES:

INVENTOR.
R. Sproul
BY
ATTORNEYS.

UNITED STATES PATENT OFFICE.

ROBERT SPROUL, OF PITTSBURG, PENNSYLVANIA.

SHAFT ATTACHMENT FOR VEHICLES.

SPECIFICATION forming part of Letters Patent No. 394,142, dated December 4, 1888.

Application filed March 13, 1888. Serial No. 267,090. (No model.)

*To all whom it may concern:*

Be it known that I, ROBERT SPROUL, a citizen of the United States, residing at Pittsburg, in the county of Allegheny and State of Pennsylvania, have invented certain new and useful Improvements in Shaft Attachments for Vehicles; and I do hereby declare the following to be a full, clear, and exact description of the invention, reference being had to the accompanying drawings, which form part of this specification.

This invention has relation to shaft attachments for two-wheeled vehicles—such as cabs, road-carts, and the like—and has for its object the provision of novel means for overcoming or obviating the horse motion and enabling the vehicle to travel smoothly and easily and without the jolting or jarring usual in two-wheeled vehicles of the class referred to.

In the Letters Patent granted May 17, 1887, to Robert W. Hare and Robert Sproul, and in certain other Letters Patent granted to the same parties and to Robert Sproul, as well as in applications for Letters Patent now pending in the name of Robert Sproul, the present applicant, certain devices are shown and described for overcoming the horse motion of vehicles, which devices are specially intended and adapted for use in connection with spiral springs constituting the medium through which the horse motion is taken up and prevented from jarring or jolting the vehicle.

The present invention contemplates the use of a different character of spring from those shown and described in said patents and previous applications, and has in view the utilization for the same purpose and for obtaining the same result of plate or flat springs so arranged as to form with the brace-rods yielding connections between the body of the vehicle and the shafts.

My invention consists, broadly, in the combination, with the body of a two-wheeled vehicle and the shafts pivoted to said body in front, of flat or elliptic springs or spring-plates secured rigidly to the body of the vehicle and at their forward ends supporting or sustaining said shafts through the medium of vertically-adjustable brace-rods, as hereinafter described and claimed.

Figure 1:
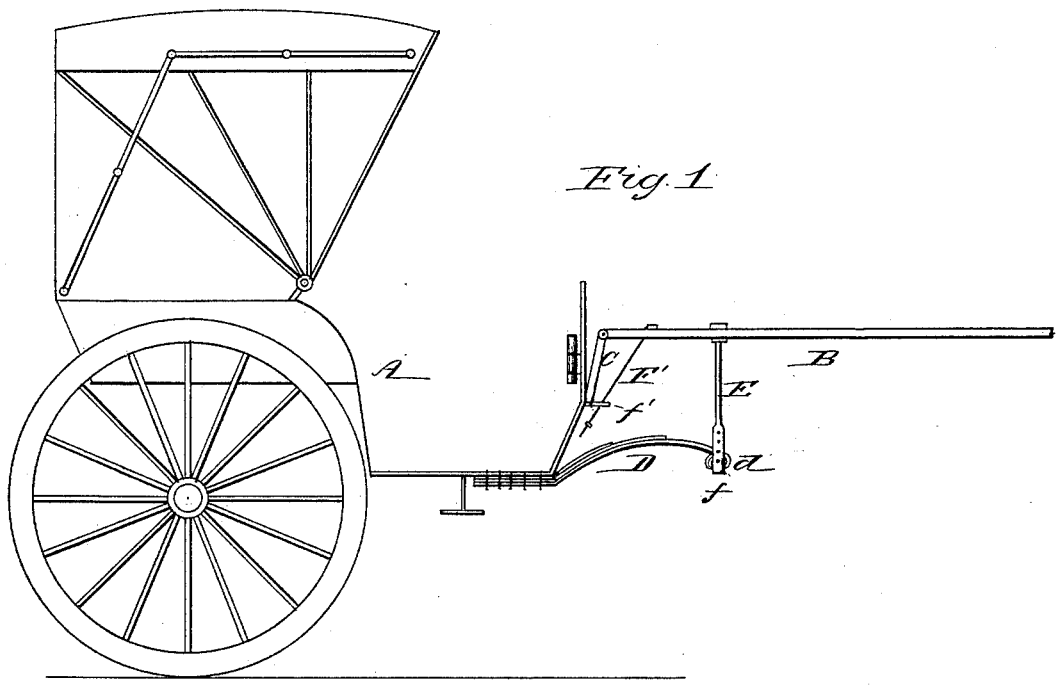
Figure 2:
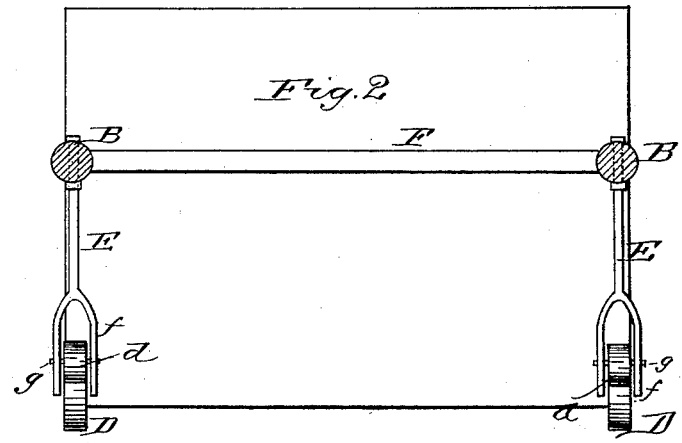

In the accompanying drawings, Figure 1 is a side view of a two-wheeled vehicle embodying my improvements; Fig. 2, a front view of the same.

A represents a vehicle of the two-wheeled type, and B B the shafts hinged to the front thereof in any suitable way, but preferably to the standards or plates C C.

D D designate a pair of plate-springs secured to the bottom of the vehicle forward of the seat by suitable bolts, and thence projecting or extending forward a short distance beyond the hinges or pivots of the shafts. These springs may be of any of the common forms of plate-springs and either curved or straight. They may be of wood or metal, but steel springs are to be preferred, and I propose in practice making them laminated—that is, of overlapping plates or sections after the manner of buggy-springs—so as to obtain the greatest degree of strength and proper resistency for the purpose for which the springs are intended. When made of steel, the outer ends of the springs or of the lower plates are bent around to form eyes *d* for the attachment of the brace-rods, through which the shafts are sustained upon the springs.

E represents the brace-rods, which are attached either rigidly or pivotally to the shafts or to the cross-bar F, and formed with forks *f* at the lower ends of the springs, to which they are fastened by transverse bolts *g g*. Each brace-rod may carry several bolts or have holes made at different heights for their reception, so that the rod may be lengthened or shortened and the position of the shafts adjusted or regulated. The brace-rods are arranged vertically, but, if desired, may be oblique.

F' F' are rods attached to the shafts and extending rearwardly at an angle toward the plates *f' f'*, through which they pass and play, nuts being fitted to their lower ends to limit their movement. These rods serve as supplementary braces and shaft-supports, serving to prevent the shafts from falling should the springs break.

In the drawings I have shown the shafts as being pivoted or hinged to standards or uprights C C, fastened to the body of the vehicle below or at the base of the dash-board, such being the proper and in many cases the only way of hinging the shafts to a vehicle having a dash-board.

The braces F', when used in connection with shafts hinged to standards, serve double purpose. They act as safety devices in case the springs or rods E should break, and also act as retaining devices should the shafts become disconnected or the standards C bent or broken. They supplement the standards C in their function of holding the shafts in position, and while relieving the standards of strain will also serve to hold the shafts should the standards break or bend.

Having described my invention, what I claim, and desire to secure by Letters Patent, is—

1. In a two-wheeled vehicle, the combination, with the body of the vehicle and the shafts pivoted to the front portion thereof, of the flat or plate springs secured to the bottom of the vehicle extending forward beneath the shaft, and the depending longitudinally adjustable brace-rods secured to the shafts and pivotally coupled to the forward ends of said springs, substantially as described.

2. The combination, with the pivoted or hinged shafts and the yielding spring-supports, of the sliding supplementary supports or braces F' F', substantially as described.

3. In a two-wheeled vehicle, the combination, with the hinged or pivoted shafts and the uprights or standards to which they are pivoted or hinged, of the supplementary braces F' F', substantially as described.

In testimony that I claim the foregoing I have hereunto set my hand this 25th day of February, 1888.

ROBERT SPROUL.

Witnesses:
  H. C. EVERT,
  LOUIS MOESER.